United States Patent [19]
Byrne

[11] Patent Number: 5,171,159
[45] Date of Patent: *Dec. 15, 1992

[54] ELECTRICAL INTERCONNECTION ASSEMBLY

[76] Inventor: Norman R. Byrne, 2736 Honey Creek, NE., Ada, Mich. 49301

[*] Notice: The portion of the term of this patent subsequent to Aug. 20, 1991 has been disclaimed.

[21] Appl. No.: 807,121

[22] Filed: Dec. 13, 1991

Related U.S. Application Data

[62] Division of Ser. No. 570,879, Aug. 22, 1990, Pat. No. 5,096,434.

[51] Int. Cl.$^5$ .................... H01R 25/00; H01R 13/627
[52] U.S. Cl. .................................. 439/215; 439/211; 439/505; 439/358
[58] Field of Search .............. 439/207, 209–216, 439/502, 505, 650–655, 357, 358, 350–356

[56] References Cited

U.S. PATENT DOCUMENTS

| | | | |
|---|---|---|---|
| 4,448,467 | 5/1984 | Weidler | 439/357 |
| 4,979,910 | 12/1990 | Revil et al. | 439/358 |
| 4,992,058 | 12/1991 | Tanner | 439/211 |
| 5,041,002 | 8/1991 | Byrne | 439/215 |
| 5,096,433 | 3/1992 | Boundy | 439/215 |
| 5,104,332 | 4/1992 | McCoy | 439/215 |

FOREIGN PATENT DOCUMENTS 1163085 9/1969 United Kingdom ................ 439/357

*Primary Examiner*—Gary F. Paumen
*Attorney, Agent, or Firm*—Varnum, Riddering, Schmidt & Howlett

[57] ABSTRACT

An electrical junction assembly for use in the wall panels of a space-divider wall system includes a junction block having several receptacle connectors to provide a plurality of electrical outlets on both sides of a wall panel. The junction block is connected by means of conduits extending from both ends of the junction block to oppositely directed connector blocks for connection to adjoining panels. This assembly of junction block and connector blocks allows electrical power to be supplied to one end of the panel and conducted to and through the junction block to other panels. The receptacle connectors on the junction block each have one type of terminal configuration, e.g., a female electrical terminal configuration and one of the connector blocks is provided with the identical terminal configuration. The other connector block is provided with a matching terminal configuration, e.g., a male electrical terminal configuration. When two wall panels are joined at their respective edges, the male connector block may be readily connected to the female connector block in the adjacent panel. When two panels are adjoined to a third panel, all at one point, the arrangement of this invention allows the male connector block to be connected to the female connector block of one of the other two panels and the male connector of the other of the other two panels may be connected to one of the receptacle connectors of the junction block on either of the other two panels, in order to establish a three-way interconnection arrangement. In a similar fashion, a fourth, or other additional panels may be added to the junction and plug into receptacle outlets of other panels in order to provide an arrangement of panels that is totally interconnected, electrically.

12 Claims, 5 Drawing Sheets

ELECTRICAL INTERCONNECTION ASSEMBLY

This is a division of application Ser. No. 07/570,879 filed Aug. 22, 1990, now U.S. Pat. No. 5,096,434 issued Mar. 17, 1992.

BACKGROUND OF THE INVENTION

1. Field of the Invention

The invention pertains to electrical interconnection systems and more particularly to such systems for use in distributing electrical power to modular wall panels or the like.

2. Prior Art

Known interior wall systems typically employ prefabricated modular units which are joined together in various configurations to divide a work space into smaller offices or work areas. Generally, such modular wall panels are equipped with raceways, for example along a bottom edge of the modular panels, for housing electrical cabling and junction blocks in order to provide electrical outlets and electrical power connections to adjacent panels. The raceway of a modular wall unit may be provided with a male connector at one end and a female connector at another end and a pair of junction blocks, each provided with electrical outlets, disposed at spaced-apart positions along the raceway. Conduits, extending between the junction blocks and between the connectors and the junction blocks, provide electrical interconnection between these units.

The modular panels of a space-divider system may be configured such that adjacent panels are in a straight line or at various angular positions relative to each other. It is common to configure intersection walls in such a fashion that three or four modular wall panels intersect at right angles. Each of the panels typically requires electrical outlets, and may require outlets on both sides of the panels. In any event, electrical power has to be provided to all of the panels and often only one of the panels at the multiple panel junction is connected to a power supply source. Under such circumstances, the interconnecting wiring becomes a significant problem, and special modifications may have to be made to power systems of wall panels used in such a configuration. Since interchangeability of the wall panel is highly desirable, such custom modifications are preferably avoided. Furthermore, modification of the panels at the installation site is bothersome and costly.

An example of a prior art system in shown in U.S. Pat. No. 4,382,648 to R. L. Propst et al. (dated May 19, 1983). In that prior art system, mating connectors of opposing panels are engaged when the panels are aligned in a straight line. When the panels are positioned in an intersecting relationship, specially manufactured couplers are used. One type of special coupler is used when the panels are positioned at right angles and another type is used when adjoining panels are arranged at angles other than right angles. Consequently, costly inventory of such special couplers must be maintained. The Propst et al. prior art system uses a double set of connectors comprising a male and a female connector for each electrical conductor to be interconnected. When a single one of these prior art panels intersects two adjacent panels, one of the specially manufactured couplers connects the female terminals to one of the adjacent panels and another of the couplers connects the male terminals to the adjacent panel.

Another example of a prior art system is shown in U.S. Pat. No. 4,135,775 to R. P. Driscoll (dated Jan. 23, 1979). In the system of that patent, each panel is provided with an electrical outlet box in its raceway, and panels of different widths are provided with a pair of female connectors, and outlet boxes of adjacent panels are interconnected by means of flexible cables having male connectors at both ends. When three or four panels are adjoined in an intersecting arrangement, two cables may be connected to the pair of female connectors at one end of an outlet box in order to facilitate connection of two adjacent panels.

Other than in the special intersecting relationship, one half of the double set of terminals of these prior systems are superfluous. This is a distinct disadvantage in modern-day systems where several independent electrical circuits are needed in wall panel system, each requiring separate connectors, while space for such circuits and their connectors is very limited in the raceway areas of modern, thin-line wall panels.

A further problem in electrical interconnection systems, such as used in wall panels, is the provision of connectors which are readily joined to each other in a secured fashion to assure continued proper electrical connection, and which may be readily disassembled when the need arises. Preferably, such connectors may be latched in an engaged position and unlatched without the need for hand tools and the like.

Another problem in electrical interconnection systems for wall panels and the like is the need to accommodate wall panels of different lengths, preferably without the need to supply different-length electrical cabling for different-length panels. Expandable cables are known and are used in the industry, but the storing of excess-length wiring sufficient to expand the cables to defined lengths remains a problem in the industry.

SUMMARY OF THE INVENTION

These and other problems of the prior art are overcome by means of an interconnecting system comprising a single building block arrangement not requiring any special couplers for intersecting wall panels and in which all existing connectors are available for use in the various different panel configurations. An electrical interconnection assembly in accordance with the present invention comprises an electrical junction block having one or more receptacle connectors formed integral thereto for receiving electrical outlet receptacles and a pair of end connectors electrically connected to the junction block for connection to similar end connectors from adjacent panels. One of the end connectors is of the same type, e.g., female, as the receptacle connector and the other is of the opposite type (e.g., male). The receptacle connectors and the end connectors all comprise the same number of terminals and corresponding terminals of all of the receptacle connectors are interconnected with each other and with corresponding terminals of the end connectors. Advantageously, the male end connector of one panel may be connected to the female end connector of an adjacent panel or one of the receptacle connectors of the adjacent panel. In one specific embodiment, the receptacle and end connectors have eight terminals each representing at least three separable electrical circuits. Advantageously, all of the circuits are available for connection at each receptacle terminal and the selected circuit to be used for each receptacle is determined by wiring internal to the outlet receptacles engaging the receptacle connectors of the junction block.

In accordance with one aspect of the invention, one of the end connectors of each panel is connected to the junction block by means of wiring contained in a flexible conduit extending beyond one end of the panel in which the associated junction block is supported and into the raceway of an adjacent panel. In a configuration in which three or more panels are positioned in an intersecting relationship, electrical power can be provided from a first panel to an adjacent panel by engaging the end connector attached to the flexible conduit extending beyond one end of the first panel with one of the receptacle connectors of the junction block of a second panel. The flexible conduit extending beyond one end of the second panel, in turn, may be connected to one of the end connectors of a third adjacent panel in a standard fashion. In this manner, all of the electrical circuits of any of the three panels are made available to the other two. In the event of four intersecting panels, the flexible conduit extending beyond one end of the fourth panel may be engaged with a receptacle connector of any of the other panels to extend all of the electrical circuits of any of the other panels to the fourth panel. In one particular embodiment of the invention, each junction block is a two-sided junction block having two oppositely directed receptacle connectors on each side of the junction block to accommodate four electrical outlet receptacles or any combination of end connectors and receptacles as may be required to obtain a desired interconnection arrangement. Advantageously, corresponding terminals of each of the for receptacle connectors are interconnected internal to the connector block by means of contact blades, each having a single crimped connection to a conductor.

In accordance with one aspect of the invention, an electrical interconnection assembly comprises a junction block housing and at least one electrical end connector connected to the junction block housing by an expandable flexible conduit, and the connector block is provided with an inner spatial area communicating with the flexible conduit and with connector terminals, and excess-length electrical wire is stored in the inner spatial area in the connector block. Advantageously, this arrangement allows desired axial extension of the flexible conduit with relatively minor modification of the end connector block and without the need to modify the junction block housing and therefore allows use of the extendable flexible conduit at either or both ends of the junction block housing.

In accordance with another aspect of the invention, the electrical connectors are provided with a latch arrangement comprising at least one resilient side flange with upper and lower recessed areas and an end edge, and the other connector is provided with oppositely extending locking flanges defining elongated openings, and the end edge of the resilient side flange of one connector is adapted to be inserted in the elongated openings, and the locking flanges are adapted to engage the upper and lower recess areas of the resilient side flange. Advantageously, latching engagement of two connectors is facilitated in accordance with this invention by the guiding action resulting from engagement of the end edge of the side flange on one connector with openings defined by the locking flanges on the other connector. The connectors may be readily disengaged without the use of tools by depressing the resilient side flange, thereby forcing disengagement of the locking flanges with the recess areas.

BRIEF DESCRIPTION OF THE DRAWING

An illustrative embodiment of the invention is described in the following detailed description, with reference to the drawing in which.

DETAILED DESCRIPTION

Figure 1:
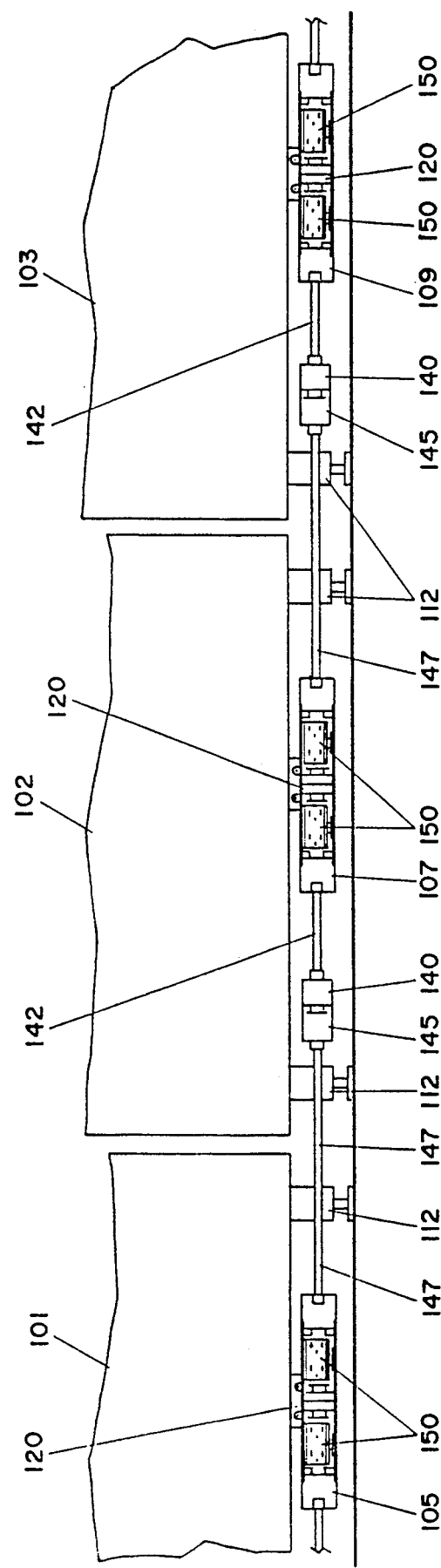
FIG. 1 is a fragmentary elevational view of a plurality of adjacent wall panels and electrical connection assemblies arranged in accordance with the invention.

FIG. 1 is a fragmentary elevational view of adjacent modular wall panels 101, 102, 103 of a rearrangeable wall system. The wall panels are provided with electrical interconnection assemblies 105, 107 and 109 in a raceway area formed along the lower edge of panels 101, 102 and 103. Each of the panels is provided with substantially flat support legs 112 which allow for passage of electrical conduits in the raceway. Raceway covers, customarily sued, have been omitted from the drawing in FIG. 1 to better show the electrical junction assemblies. Each of the electrical interconnection assemblies 105, 107, 109 is provided with a junction block 120, a female electrical connector block 140 and a matching male connector block 145. The connector blocks 140, 145 are connected to associated junction blocks 120 by means of conduit sections 142 and 147, respectively. Each of the junction blocks 120 is shown in FIG. 1 to be provided with a pair of electrical outlet receptacles 150. Junction blocks 120 are double sided and corresponding pairs of outlet receptacles are provided on the opposite side of each of the wall panels 101, 102 and 103 (not shown in the drawing) to allow various electrical equipments to be plugged into the outlets from either side of the panel.

Figure 2:
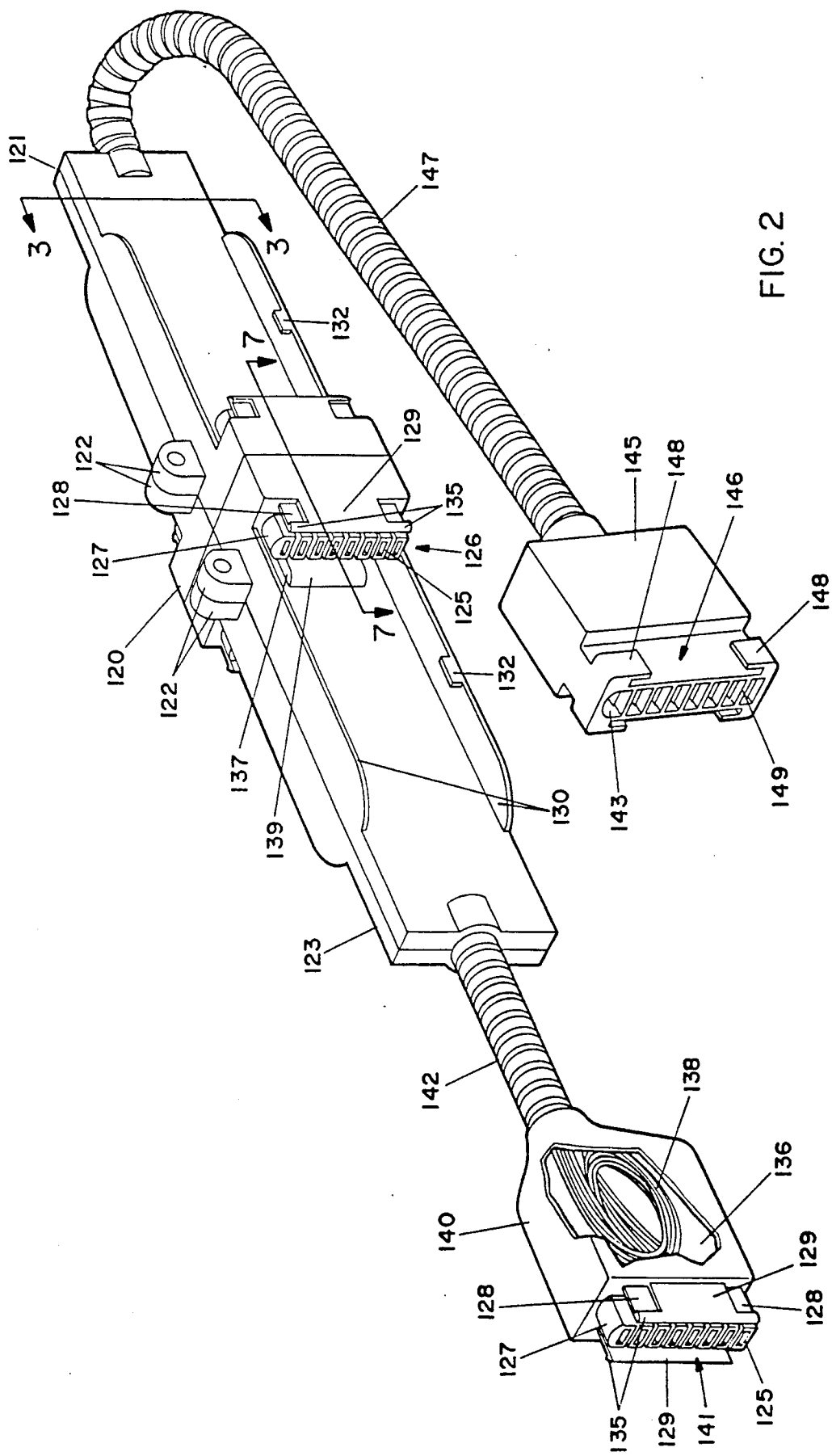
FIG. 2 is an enlarge perspective view of one of the electrical interconnection assemblies of FIG. 1.

FIG. 2 is an enlarged perspective view of one of the electrical interconnection assemblies, for example assembly 107. The junction block 120 is provided with support lugs 122 by which the junction block is supported by standard fasteners extending through support tabs extending from the bottom edge of the wall panel, e.g., wall panel 102. Junction block 120 comprises an elongated housing having opposing ends 121 and 123 and a symmetrical center section comprising four female receptacle connectors 126. Only one of the receptacle connectors 126 is fully exposed in FIG. 2. There is a pair of connectors 126 on each side of the housing and the connectors on each side face in opposite directions. Support flanges 130 are provided adjacent each of the female connectors to provide support for electrical outlet receptacles engaged with the connectors 126. In this manner, junction block 120 is adapted to support four electrical outlet receptacles, two on each side of a wall panel to which junction block 120 is attached. The junction block assembly further comprises end connector block 140, provided with a female connector 141, and connected via a standard electrical conduit 142, which may be a flexible conduit, to end 123 of junction block 120. Similarly, connector block 145, provided with a male connector 146 is connected via flexible conduit 147 to end 121 of junction block 120. In a straight line connection arrangement, as depicted for example in FIG. 1, wherein a plurality of panels are positioned adjacent each other, electrical power is transmitted between panels by connection of male connector block 145 to female connector block 140 of the adjacent junction assembly.

Electrical power is transmitted through the junction assembly by means of electrical wires disposed in the conduits 142, 147, terminated on connectors 141 and 146, respectively, and connected to receptacle connectors 126 in junction block 120. Accordingly, electrical power is transmitted through interconnecting panels and is at the same time made available at electrical outlet receptacles in each panel. Conduit 147, provided with the male connector block 145, may be a fixed-length conduit and conduit 142 may be of a length such that female connector block 140 is positioned at substantially the same distance from the panel edge in each panel independent of the width of the panel. Thus, female connector block 140 will always be accessible to male connector block 146 independent of the width of the panels. To accommodate panels of different widths, conduit 142 may be an expandable flexible conduit, such as are well known in the art. In that case, connector block 140 may be provided with an inner spatial area 136, as shown in a partially broken-away view in FIG. 2. The inner spatial area 136 is provided for storage of excess length of electrical wiring 138 in a coiled or other configuration. The excess length of electrical wiring 138 may be withdrawn when conduit 142 is expanded to an extended length. This arrangement is similar to that disclosed in my earlier patent, U.S. Pat. No. 4,579,403 (dated Apr. 1, 1986) and entitled ELECTRICAL JUNCTION ASSEMBLY WITH ADJUSTABLE CONNECTORS.

Figure 4:
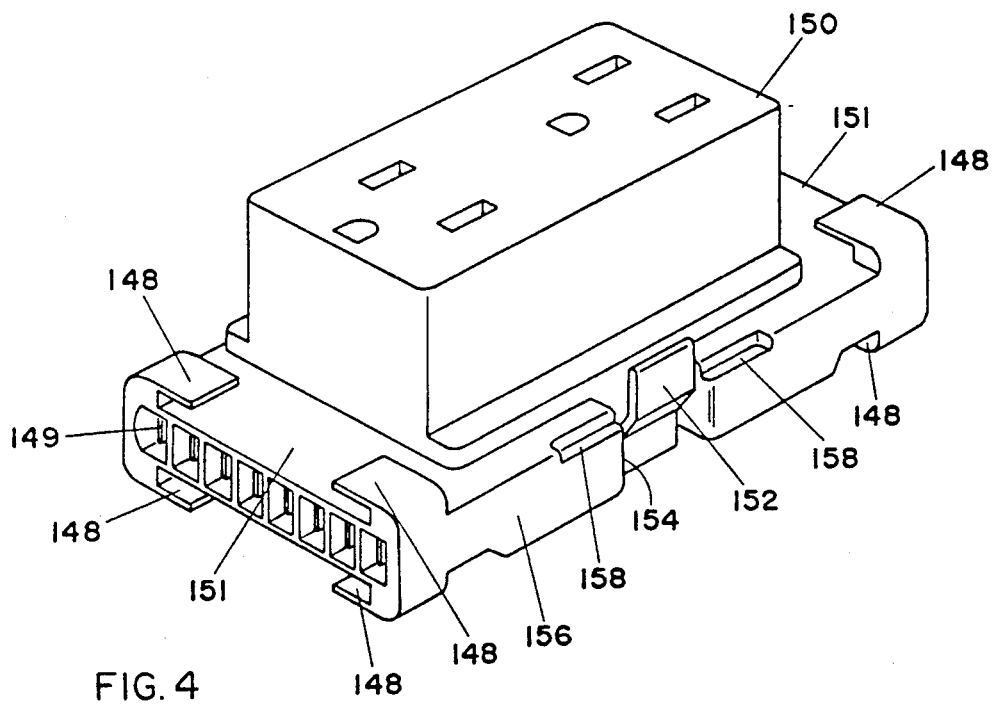
FIG. 4 is an enlarge perspective view of an outlet receptacle shown in FIG. 1.

The conduit 147 is preferably a flexible conduit which may be bent to accommodate a connection to adjacent panels which are disposed at angular positions with respect to each other, rather than in a straight line. The junction assemblies of this invention readily accommodate an arrangement in which three or more panels are disposed in an intersection relationship, as will be discussed further herein with resect to FIG. 6. In such a configuration, the male connector block 145 of one of the panels may be connected to one of the female receptacle connectors 126 of a junction block assembly in an adjacent wall panel. For this purpose, the female connector 141 of connector block 140 and female receptacle connectors 126 on junction block 120 have been made identical. Similarly, the male connector 146 on connector block 145 has been made identical to the male connector of electrical outlet receptacle 150, shown in FIG. 1. Greater detail of the receptacle 150 is shown in FIG. 4 and is described below. As may be seen from FIG. 2, the female connectors 126 and 141 are each provided with a pair of side flanges 129 having upper and lower recessed areas 128, for engagement with flanges 148 of a male connector to provide a locking arrangement. Flanges 129, which are made of a resilient plastic material and formed integral to the housing to which they are connected, are provided with an outwardly extending inclined end surface 135. When surfaces 135 are engaged by flanges such as flanges 148 of connector 146 on connector block 146, the flanges 129 will be deflected inward, allowing flanges 148 of the male connector to engage recesses 128 to provide a locking engagement of the male and the female connectors. A protuberance 137 is provided with a generally rounded edge surface 139 and acts as an entry guide as a male connector is engaged in female connector 126. The female connectors 126, 141 are each provided with a plurality of female connector terminals 125 and a key lug 127. Male connector 146 is provided with a plurality of male connector terminals 149 and an opening 143 for receiving key lug 127.

Figure 5:
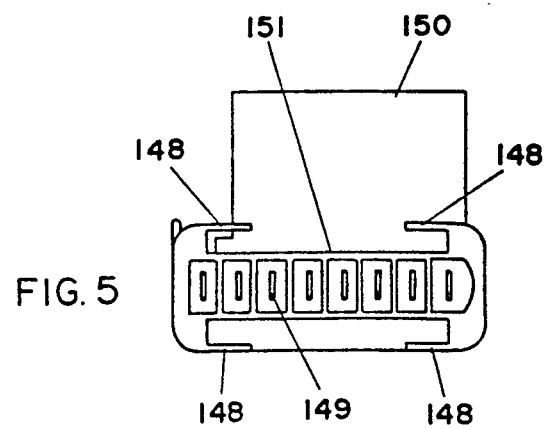
FIG. 5 is a side elevation of the outlet receptacle of FIG. 4.

The electrical outlet receptacle 150, shown in FIG. 4, is provided with male connectors 151 at both ends, allowing the receptacle to be plugged into any one of the four female receptacle connectors 126 of junction block 120. As shown in FIG. 2, junction block 120 is provided with upper and lower support flanges 130 to support receptacles 150 in each of the four female connectors 126. The lower support flanges 130 are provided with a locking flange 132. The receptacle 150 is provided with a spring latch 152 disposed in recess 154 in the surface 156 of receptacle 150. Surface 156 engages one of the lower support flanges 130 when the receptacle 150 is installed in the junction block 120. The locking flange 132 will be aligned with the recess 154 when the receptacle 150 is inserted between flanges 130, causing the spring latch 152 to be depressed. The receptacle 150 may then be moved to either the left or to the right to engage one of the female connectors 126. Recesses 158 are provided in receptacle 150 to accommodate locking flange 132 and movement to either the left or the right by a sufficient distance will cause the spring latch 152 to be moved past locking flange 132, causing the spring latch 152 to return to its extended position. Hence, receptacle 150 will be retained in a locked position. The receptacle may be removed by depressing spring latch 152 and sliding the receptacle 150 to either left or right to align the locking flange 132 with recess 154. FIG. 5 is a right-hand elevation of receptacle 150 showing right-hand male connector 151.

Figure 3:
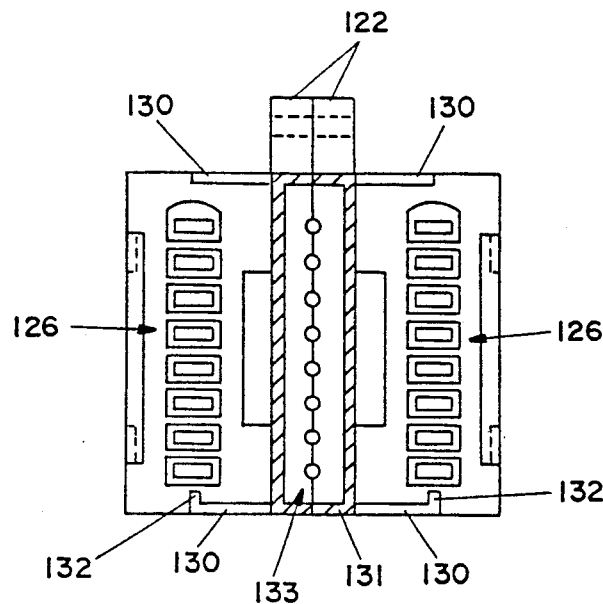
FIG. 3 is a cross-sectional view taken along line 3—3 of FIG. 2.

FIG. 3 is a cross-sectional view of junction block 120 taken along line 3—3 of FIG. 2. FIG. 3 shows two of the four receptacle connectors 126 of connector block 120. One of the two connectors 126 shown in FIG. 3 is disposed on each side of the central housing section 131, which contains a plurality of wires 133. An eight-wire system is shown in this illustrative embodiment. Each of the male and female connectors are provided with eight separate terminals, and eight separate electrical wires 133 extend through the connector blocks 140, 145, the conduits 142, 147 and the central section 131 of the junction block 120. By way of example, these may include two ground terminal wires, three neutral wires and three positive wires representing three separate circuits, with a shared ground for two of the circuits. Similarly, 10- or 12-wire systems may be readily accommodated, having corresponding numbers of terminals on each of the connectors and providing a greater number of separate circuits. The four female receptacle connectors 126 are each connected to the wires 133 by means of a plurality of contact blades, described later herein with respect to FIGS. 7 and 8. Each wire, together with the connector block terminals and receptacle connector terminals to which it is connected, is referred to herein as a circuit element. A particular circuit may be selected for use by one of the receptacles 150 by appropriate wiring connections internal to the receptacle. Since all of the circuits are connected to each one of the receptacle connectors 126 of junction block 120, a connector block 145 of an adjacent panel, equipped with a male connector, may be connected to any one of the receptacle connectors 126. In this manner, electrical power may be provided to receptacle connectors in junction block 120 and the associated connector blocks 140, 145 and hence to any adjacent panels to which these connectors may be connected. Similarly, a connector block 145 equipped with a male connector connected to one of the female connectors 126 may receive electrical power for distribution to a panel to which the connector block 145 belongs. Such interconnecting arrangements are described further herein with respect to FIG. 6.

Figure 7:
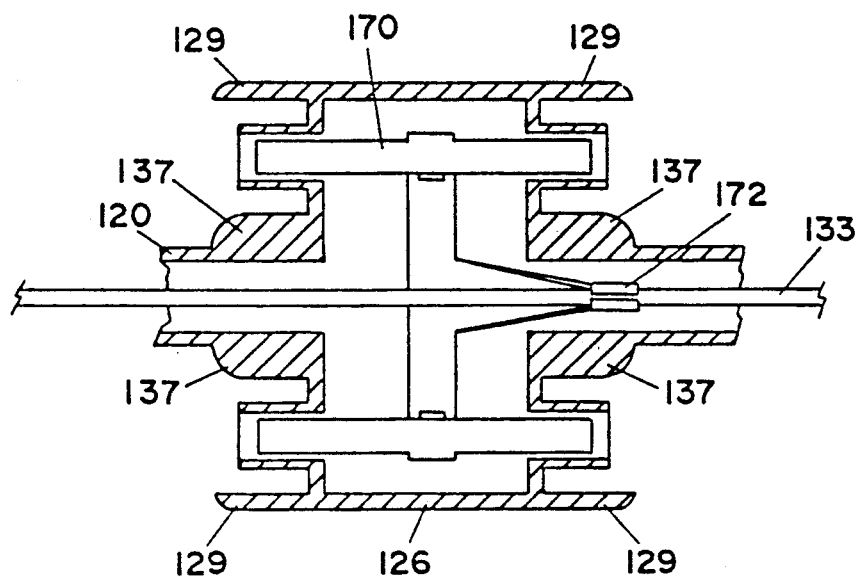
FIG. 7 is a fragmentary cross-sectional view along line 7—7 of FIG. 2.
Figure 8:
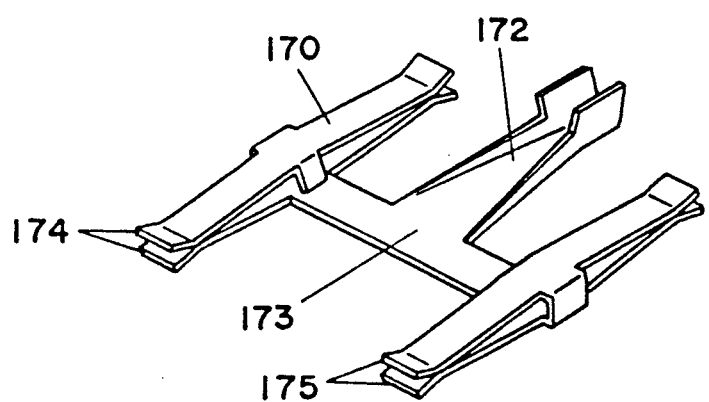
FIG. 8 is a perspective view of a receptacle contact blade shown in FIG. 7.

FIG. 7 is a fragmentary cross-sectional view along line 7—7 of FIG. 2. Shown in FIG. 7 is a contact blade 170 which is one of eight such blades disposed in central housing section 131. Each such blade is in electrical contact with one of the conductors 133. Connection to conductor 133 is made by means of a crimped connection of blade extension member 172 to conductor 133. As may be more readily seen from the perspective view of FIG. 8, the extension member 172 is part of a center section 173 which is connected to right-hand upper and lower contact blades 174 and left-hand upper and lower contact blades 175. The upper and lower contact blades on each side form the female opening part of the connector 126 for engagement with blades of a male connector.

Figure 6:
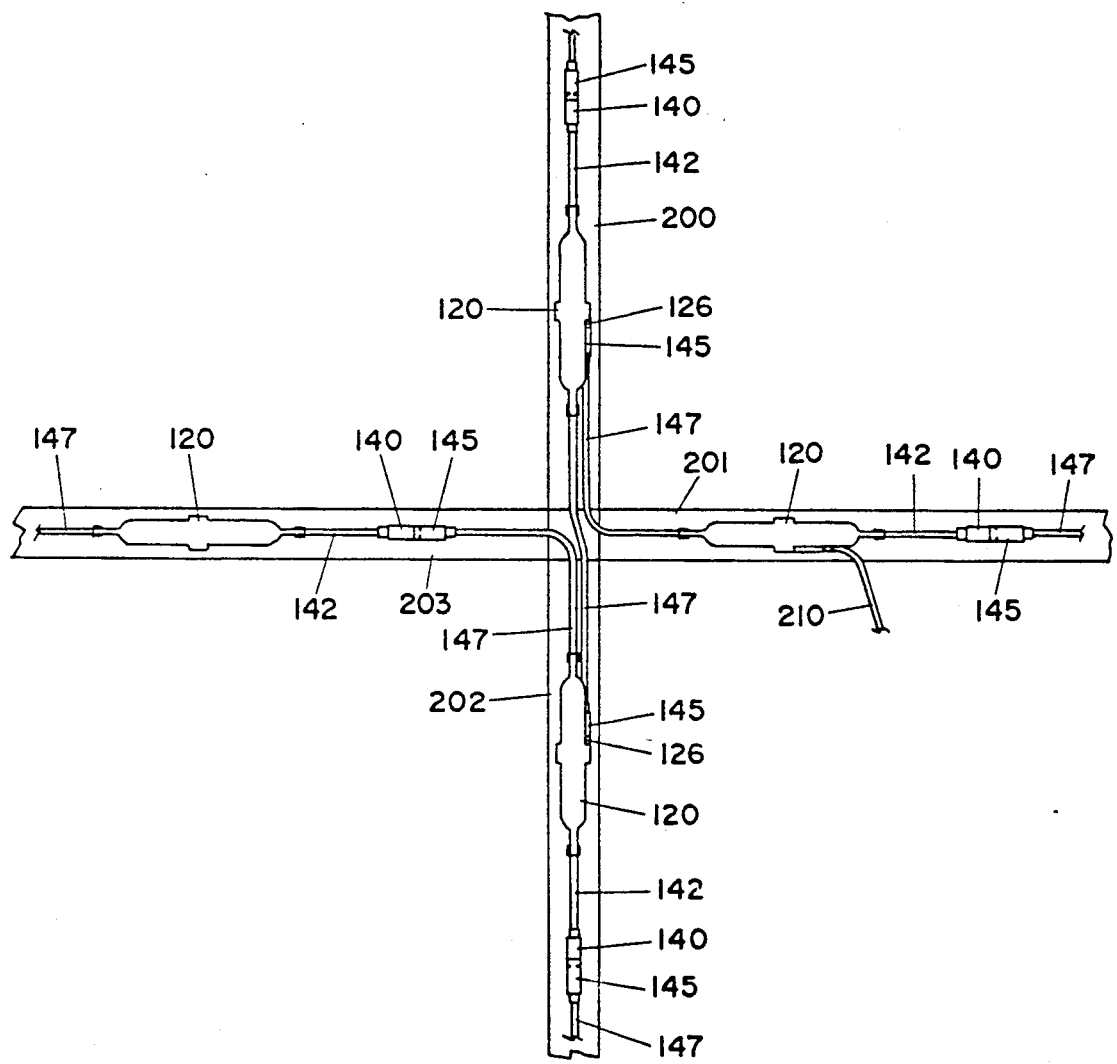
FIG. 6 is a fragmentary plan view of raceway areas of four wall panels, illustrating wall panel interconnections in accordance with the invention.

FIG. 6 is a fragmentary plan view of raceway areas of four wall panels illustrating the connections in interconnection assemblies of the invention in a configuration in which the four panels are disposed at right angles to each other. As will be apparent from the following description, the specific angle at which the panels are positioned is not particularly significant. Furthermore, the invention is equally applicable to a three-panel configuration or a five-panel configuration disposed at various angles. FIG. 6 represents the raceway portions of four panels 200, 201, 202, and 203 disposed at right angles to each other. Each of the four panels is provided with an interconnection assembly, as shown in FIG. 2, comprising a junction block 120, a male connector block 145, and a female connector block 140 attached to the junction block 120 by means of flexible conduits 147 and 142, respectively. The junction block 120 is disposed within each panel raceway near one edge of the panel. Panels 200, 201, 202 are positioned such that the end at which these panels are joined to other panels is the end near which the junction block 120 is positioned. One of the panels, panel 203, is positioned with an opposite orientation in which the end near which the junction block 120 is located is positioned opposite the point of junction of the four panels. The flexible conduit 147, provided with the male connector block 145, extends beyond the end of the panel in which it is positioned, and the flexible conduit 142, provided with a female connector block 140, is terminated just short of the end of the panel. Thus, as is also shown in FIG. 1, a connection is made between panels by extending the flexible conduit 147 with male connector block 145 into the raceway area of the adjacent panel to engage the female connector block 140 at the end of flexible conduit 142.

In the configuration of FIG. 6, the male connector block 145 of panel 202 and its associated flexible conduit 147 extend into the raceway area of panel 203 to engage female connector block 140 of panel 203. It will be apparent that the connection as shown between panel 202 and 203 may be made whenever these panels are adjacent and independent of the angle at which the panels are disposed with respect to each other. In the configuration of FIG. 6, the flexible conduit 147, with its male connector block 145, associated with the panel 200 are extended into the raceway area of panel 202 for engagement with one of the female receptacle connectors 126 of junction block 120 in panel 202. In this manner, an electrical connection is established among the junction blocks of the three panels 200, 202, and 203. Thus, electrical power provided from an external source to any one of these three may be distributed to the other two by means of the connection arrangement shown by way of example in FIG. 6. In the arrangement of FIG. 6, flexible conduit 147 and its male connector block 145 of panel 201 is connected to one of the female connectors 126 of junction block 120 of panel 200 thereby establishing an electrical connection between panels 200 and 201. This connection, in combination with the other connections shown in FIG. 6 and described in the previous sentences, completes an arrangement for establishing an electrical connection from any one of four panels to the entire four-panel configuration. Additional connections may be envisioned by connections of male connectors 145 from other panels into additional ones of the female receptacle connectors 126 of the junction blocks 120 of any of the panels 201 through 203, should one choose to provide an arrangement of more than four intersection panels. Furthermore, additional conduits, such as conduit 210 shown in FIG. 6, may be connected by means of a male connector to any of the receptacle connectors 126 to provide electrical power to lamps or other fixtures. As can be seen, a great deal of flexibility has been achieved by the electrical junction assembly in accordance with this invention.

It will be understood that the embodiments disclosed herein are only illustrative of the invention and numerous other arrangements may be devised by those skilled in the art without departing from the spirit and scope of the invention.

What is claimed is:

1. An electrical interconnection assembly for use in a space-divider wall system comprising:
   a junction block housing having opposite ends and at least one electrical connector disposed in said junction block housing;
   an electrical end connector comprising an end connector terminal and an end connector housing having an inner spatial area;
   an expandable flexible conduit interconnecting said end connector block and one end of said junction block housing and adjustable in axial length; and
   electrical wiring disposed in said conduit and interconnecting said connector terminal of said end connector and said at least one electrical connector in said junction block housing;
   said inner spatial area having one end communicating with said flexible conduit and an other end communicating with said end connector terminal;
   said electrical wiring comprising a section of excess-length wire retained within said spatial area when said flexible conduit is adjusted to a relatively shortened axial length.

2. The interconnection assembly in accordance with claim 1 wherein said end connector comprises a plurality of individual end connector terminals and said electrical wiring comprises a plurality of individual wires, each of said individual wires connected to one of said individual terminals and comprising a section of excess-length wire retained within said spatial area.

3. The interconnection assembly in accordance with claim 1 wherein said end connector comprises an elongated strip of linearly arranged individual end connector terminals and wherein said connector housing is elongated in a corresponding manner and said inner spatial area comprises an elongated spatial area for accommodating said excess length of wiring in a coiled form.

4. The electrical interconnection assembly in accordance with claim 1 and further comprising an other end connector connected to another end of said junction block housing and wherein said electrical connector in said junction block housing comprises a receptacle connector;

said receptacle connector comprising a frontal surface and a set of aligned connector terminals disposed on said frontal surface and a resilient side flange extending outwardly from said frontal surface and along one side of said set of aligned connector terminals, said resilient side flange having an outer surface and upper and lower recess area in said outer surface and an end edge;

one of said end connectors comprising a frontal surface and a set of aligned connector terminals disposed on said frontal surface of said one end connector and a resilient side flange extending outwardly from said frontal surface of said one end connector and along one side of said set of aligned connector terminals on said one end connector and having an outer surface and upper and lower recess areas in said outer surface of said side flange on said one end connector and having an end edge;

said other end connector comprising a frontal surface and a set of aligned connector terminals disposed on said frontal surface of said other end connector and a wall member extending outwardly from said frontal surface of said other end connector and along one side of said set of aligned connector terminals on said other end connector, said wall member having an outer surface and a pair of spaced-apart oppositely extending upper and lower locking flanges on said outer surface of said wall member defining elongated openings between said locking flanges and said outer surface of said wall member;

said end edge of said resilient side flanges adapted to be inserted in said elongated openings and said locking flanges adapted to engage said upper and lower recess areas.

5. A latch arrangement for latching first and second electrical connectors, each of said connectors comprising a frontal surface and a set of aligned connector terminals disposed on said frontal surface, said latch arrangement comprising:

at least one resilient side flange extending outwardly from said frontal surface of said first connector and along said side of said set of aligned connector terminals, said side flange having an outer surface and upper and lower recess areas in said outer surface and having an end edge; and at least one wall member extending outwardly from said frontal surface of said second connector and along one side of said set of aligned connector terminals of said second connector and having an outer surface; and at least one pair of spaced-apart oppositely extending upper and lower locking flanges on said outer surface of said wall member and defining elongated openings between said locking flanges and said outer surface of said wall member;

said end edge of said resilient side flange adapted o be inserted in said elongated openings and said locking flanges adapted to engage said upper and lower recess areas;

whereby said first and second connectors are retained in a locking relationship when said locking flanges are in engagement with said recess areas of said resilient side flange.

6. The latch arrangement in accordance with claim 5 wherein said end edge comprises an inclined surface to facilitate engagement of said side flange with said locking flanges.

7. The latch arrangement in accordance with claim 5 and further comprising:

an additional resilient side flange extending outwardly from said frontal surface of said first connector and along an opposite side, opposite said one side of said set of aligned connector terminals of said first connector and having an end edge and an outer surface and upper and lower recess areas in said outer surface of said additional side flange; and an additional wall member having an outer surface and extending outwardly from said frontal of said second connector and along an opposite side, opposite said one side of said set of aligned connector terminals of said second connector; and an additional pair of spaced-apart oppositely extending upper and lower locking flanges on said surface of said additional wall member for engaging said additional side flange and defining elongated openings between said additional locking flanges and said additional wall member;

said end edge of said additional resilient side flange adapted to e inserted in said elongated openings formed by said additional pair of locking flanges and said additional pair of locking flanges adapted to engage said upper and lower recess areas of said additional side flange.

8. The latch arrangement in accordance with claim 5 wherein said second connector further comprises an additional wall member extending outwardly from said frontal surface of said second connector and along an opposite side, opposite said one side of said set of aligned connector terminals of said second connector, and said first connector further comprises a protuberance extending from said frontal wall of said first connector along an opposite side, opposite said one side of said aligned set of connector terminals of said first connector, said protuberance comprising a generally rounded edge along one side thereof adjacent said connector terminals of said first connector for engagement with said additional wall member, thereby facilitating engagement of said first and said second connectors.

9. The latch arrangement in accordance with claim 5 wherein one of said first and said second connectors comprises at least one key lug and another of said first and said second connectors comprises an opening for receiving said at least one key lug.

10. An electrical junction block assembly for use in a space-divider wall system comprising:
   an elongated junction block housing have opposite ends and opposite side walls and an enlarged section extending laterally beyond at least one of said side walls and a receptacle connector in said enlarged section comprising a set of aligned electrical terminals directed toward one of said opposite ends; and
   an electrical receptacle block disposed along said at least one of said side walls, having a frontal wall and an electrical outlet in said frontal wall and having an end wall and a connector in said end wall comprising a set of aligned electrical terminals for engagement with said set of terminals of said receptacle connector;
   said receptacle connector comprising a resilient side flange extending outwardly from said enlarged section toward said one of said opposite ends and along one side of said set of aligned terminals of said receptacle connector away from said at least one of said side walls, said flange comprising an outer surface and upper and lower recess areas in said outer surface and an end edge;
   said receptacle block comprising a wall member extending outwardly from said end wall along one side of said set of aligned electrical terminals of said receptacle block and having an outer surface and at least one pair of oppositely extending upper and lower locking flanges on said outer surface of said wall member for engaging said resilient side flange and defining elongated openings between said locking flanges and said wall member;
   said end edge of said resilient side flange adapted to be inserted in said elongated openings and said locking flanges adapted to engage said upper and lower recess areas.

11. An electrical junction block assembly in accordance with claim 10 wherein said receptacle connector further comprises a protuberance extending outwardly from said enlarged section and along another side of said set of aligned terminals of said receptacle connector opposite said one side of said aligned terminals of said receptacle connector and wherein said receptacle block comprises an additional wall member extending outwardly from said end wall along another side of said set of aligned electrical terminals of said receptacle block, said protuberance comprising a generally rounded edge along one side thereof adjacent said connector terminals of said receptacle connector for engagement with said additional wall member.

12. In a space-divider wall system including plurality of adjacently disposed modular upright wall panels each having vertically extending opposite end edges and a raceway area extending between said edges and an electrical interconnection assembly disposed in each of said raceways, each of said assemblies comprising:
   a junction block mounted at a predetermined position in each of said raceways and comprising a junction block housing having oppositely extending ends and oppositely extending side walls and an enlarged midsection extending laterally beyond said side walls, said midsection comprising a pair of oppositely directed receptacle connectors on each of said side walls, said receptacle connectors each having a first predetermined terminal connection arrangement for engagement with a connector having a second predetermined terminal connection arrangement;
   a first end connector having said first predetermined terminal connection arrangement;
   a second nd connector having said second predetermined terminal connection arrangement;
   a first conduit section connected between said first end connector and one of said ends of said housing and having a length less than required to extend said first end connector to one of said wall panel end edges;
   a second conduit section connected between said second end connector and an opposite end of said housing, opposite said one end, and having a length sufficient to extend said second end connector beyond an opposite wall panel end edge, opposite said one wall panel end edge, and extending into said raceway of one of said adjacent wall panels for connection with a selected one of said first end connector and a receptacle connector of one of said electrical interconnection assemblies disposed in said one of said adjacent wall panels;
   said receptacle connectors and said first end connector each comprising a frontal surface and a set of aligned connector terminals disposed on said frontal surface and a resilient side flange extending outwardly from said frontal surface and along one side of said set of aligned connectors, said resilient side flange having an outer surface and upper and lower recess areas in said outer surface and having an end edge;
   said second end connector comprising a frontal surface and a set of aligned connector terminals disposed thereon and at least one wall member extending outwardly from said frontal surface of said second connector and along one side of said set of aligned connector terminals of said second connector and having an outer surface;
   at least one pair of spaced-apart oppositely extending upper and lower flanges on said outer surface of said wall member defining elongated openings between said locking flanges and said outer surface of said wall member and said end edge of said resilient side flange adapted to be inserted in said elongated openings and said locking flanges adapted to engage said upper and lower recess areas;
   at least one of said first and said second end connector comprising a connector housing having an inner spatial area and connected to said junction block housing by a flexible conduit adjustable in axial length and having electrical wiring disposed in said conduit and interconnecting said at least one end connector and said junction block housing, said inner spatial area having one end communicating with said flexible conduit and another end communicating with said aligned connector terminals of said at least one end connector, said electrical wiring comprising a section of excess-length wire retained within said spatial area when said flexible conduit is adjusted to a relatively shorter axial length.

* * * * *

UNITED STATES PATENT AND TRADEMARK OFFICE
CERTIFICATE OF CORRECTION

PATENT NO. : 5,171,159

DATED : Dec. 15, 1992

INVENTOR(S) : Byrne

It is certified that error appears in the above-identified patent and that said Letters Patent is hereby corrected as shown below:

On the title page:

In the "Notice" on the cover sheet "Aug. 20, 1991" should read --Aug. 20, 2008--.

Claim 4, column 9, line 31, "area" should read --areas--.

Claim 5, column 10, line 13, "o" should read --to--.

Claim 12, column 12, line 9, "nd" should read --and--.

Signed and Sealed this

Fifteenth Day of February, 1994

*Attest:*

BRUCE LEHMAN

*Attesting Officer*  *Commissioner of Patents and Trademarks*